United States Patent [19]
Palvoelgyi et al.

[11] Patent Number: 6,009,920
[45] Date of Patent: Jan. 4, 2000

[54] CAPLESS REFUELING ASSEMBLY

[75] Inventors: Sandor Palvoelgyi, Weiz, Austria; Peter Reinlaender, Tottenham, Canada; Gunther Pozgainer, Weiz, Austria

[73] Assignee: Tesma International Inc., Ontario, Canada

[21] Appl. No.: 09/118,316

[22] Filed: Jul. 17, 1998

Related U.S. Application Data

[60] Provisional application No. 60/052,082, Jul. 17, 1998.

[51] Int. Cl.$^7$ ...................................................... B65B 3/18
[52] U.S. Cl. ........................... 141/348; 141/59; 141/302; 220/86.2; 220/746; 137/588
[58] Field of Search ................................ 141/2, 8, 44–46, 141/59, 290, 302, 304, 305, 312, 348–350; 137/587–589; 220/86.1, 86.2, 746

[56] References Cited

U.S. PATENT DOCUMENTS

| | | |
|---|---|---|
| 2,294,190 | 8/1942 | Lee . |
| 2,574,836 | 11/1951 | Marcell . |
| 3,730,216 | 5/1973 | Arnett et al. . |
| 3,911,977 | 10/1975 | Berger . |
| 4,274,549 | 6/1981 | Germain . |
| 4,498,600 | 2/1985 | Blion . |
| 4,630,749 | 12/1986 | Armstrong et al. ..................... 220/86.2 |
| 4,651,889 | 3/1987 | Uranishi et al. . |
| 4,706,708 | 11/1987 | Fornuto et al. ........................... 137/588 |
| 4,714,172 | 12/1987 | Mooris . |
| 4,719,949 | 1/1988 | Mears ....................................... 141/301 |
| 4,747,508 | 5/1988 | Sherwood ............................... 220/86.2 |
| 4,765,504 | 8/1988 | Sherwood et al. . |
| 4,816,045 | 3/1989 | Szlaga et al. . |
| 4,941,587 | 7/1990 | Terada ..................................... 220/86.2 |
| 4,946,060 | 8/1990 | Sherwood et al. ...................... 220/86.2 |
| 4,966,299 | 10/1990 | Teets et al. . |
| 5,022,433 | 6/1991 | Jansky et al. ............................ 137/588 |
| 5,042,678 | 8/1991 | Munguia . |
| 5,056,570 | 10/1991 | Harris et al. . |

(List continued on next page.)

FOREIGN PATENT DOCUMENTS

| | | |
|---|---|---|
| 0 223 051 | 6/1989 | European Pat. Off. . |
| 196 38 162 | 3/1997 | Germany . |
| 96/00135 | 1/1996 | WIPO . |
| 96/33095 | 10/1996 | WIPO . |

*Primary Examiner*—J. Casimer Jacyna
*Attorney, Agent, or Firm*—Pillsbury Madison & Sutro, LLP

[57] ABSTRACT

The present invention is a capless refueling assembly for a motor vehicle fuel tank. The capless refueling assembly has a housing assembly having a nozzle-receiving opening in fluid communication with the fuel tank such that a fuel nozzle can be inserted in the nozzle-receiving opening and supply liquid fuel to the fuel tank. A primary seal is mounted within the housing assembly for pivotal movement between a sealed position wherein the primary seal sealingly closes the nozzle-receiving opening and an open position. The pivotal movement is responsive to a fuel nozzle being inserted into and removed from the nozzle-receiving opening. A closure is pivotally mounted to the housing assembly for movement between a covering position wherein the closure covers a mouth of the nozzle-receiving opening and an access position wherein a fuel nozzle can be inserted into the nozzle-receiving opening. A vapor venting valve engages the primary seal for cooperative movement therewith. The vapor valve includes a first biasing element for biasing the primary seal to the sealed position. The venting valve is movable between a venting position wherein fuel vapor in the fuel tank is permitted to vent from the fuel tank through a vapor flow path and a valve closed position wherein fuel vapor in the fuel tank is prevented from venting through said vapor flow path. The venting valve includes a second biasing element for biasing the venting valve to the valve closed position. The movement of the venting valve is responsive to a fuel nozzle being inserted into and removed from the fuel nozzle-receiving opening and responsive to a pressure condition in the fuel tank. The primary seal is movable from the sealed position overcoming the first biasing element in response to a vacuum condition in the fuel tank.

17 Claims, 12 Drawing Sheets

U.S. PATENT DOCUMENTS

| | | | |
|---|---|---|---|
| 5,071,018 | 12/1991 | Moore . | |
| 5,103,877 | 4/1992 | Sherwood et al. | 141/59 |
| 5,186,220 | 2/1993 | Scharrer | 141/59 |
| 5,271,438 | 12/1993 | Griffin et al. | 141/59 |
| 5,404,906 | 4/1995 | Aoshima et al. | 137/587 |
| 5,732,840 | 3/1998 | Foltz . | |
| 5,740,842 | 4/1998 | Maier et al. | 141/45 |
| 5,791,387 | 8/1998 | Palvolgyi | 141/348 |

CAPLESS REFUELING ASSEMBLY

This application claims the benefit of U.S. Provisional Application No. 60/052,082, filed Jul. 17, 1998.

FIELD OF INVENTION

The present invention relates to a capless refueling assembly.

BACKGROUND OF INVENTION

During a refueling operation, liquid fuel is supplied to the tank of a motor vehicle. Fuel vapors which are present in the fuel tank are displaced by the liquid fuel filling the tank and must be properly vented in order to prevent an undesirable pressure build-up. It is preferable that such venting takes place in response to the initiation of the refueling operation rather than waiting for the vapor pressure to increase to a high level. Thus, it has been known in the art to provide venting arrangements which operate in response to the insertion of a fuel nozzle. Examples of such arrangements are disclosed in U.S. Pat. Nos. 4,765,504, 4,630,749, and 4,719,949.

However, the arrangements disclosed in these patents are all directed to constructions in which the mouth of the system is sealed with a removable cap. The use of a removable cap can often times be problematic due to the potential for loss by the operator. When the cap is lost and the system is not properly sealed, debris can enter the system and fuel vapors escape.

Typically during operation of a motor vehicle, fuel in the fuel tank will be consumed so as to create a vacuum condition. In order to alleviate this vacuum condition, typical fuel systems allow ambient air to be drawn into the fuel tank. In order to facilitate air flow, a removable fuel cap may be configured to provide for such flow or one or more orifices may be formed in the filler neck. However, the air permitted to flow into the fuel tank is unfiltered and can carry with it debris and contaminants. Such unfiltered air can have a harmful effect on the fuel's purity and can result in decreased vehicle performance. Furthermore, if the removable fuel cap is lost, even more debris will be permitted into the refueling system when the flap valve door opens inwardly because the cap is not present to prevent debris from entering the mouth of the system.

SUMMARY OF INVENTION

The disadvantages of the prior art may be overcome by providing a refueling assembly combining the advantages of a system in which fuel vapor is vented in response to initiation of a refueling operation without the disadvantages associated with a removable fuel cap.

It is desirable to provide a refueling assembly which is adapted to relieve vacuum conditions without permitting debris to contaminate the fuel supply and which is free from the additional disadvantages associated with the use of removable fuel caps.

In accordance with the principles of the present invention, there is provided a capless refueling assembly which has a housing assembly having a nozzle-receiving opening in fluid communication with the fuel tank such that a fuel nozzle can be inserted in the nozzle-receiving opening and supply liquid fuel to the fuel tank. A primary seal is mounted within the housing assembly for pivotal movement between a sealed position wherein the primary seal sealingly closes the nozzle-receiving opening and an open position. The pivotal movement is responsive to a fuel nozzle being inserted into and removed from the nozzle-receiving opening. A closure is pivotally mounted to the housing assembly for movement between a covering position wherein the closure covers a mouth of the nozzle-receiving opening and an access position wherein a fuel nozzle can be inserted into the nozzle-receiving opening. A vapor venting valve engages the primary seal for cooperative movement therewith. The vapor valve includes a first biasing element for biasing the primary seal to the sealed position. The venting valve is movable between a venting position wherein fuel vapor in the fuel tank is permitted to vent from the fuel tank through a vapor flow path and a valve closed position wherein fuel vapor in the fuel tank is prevented from venting through said vapor flow path. The venting valve includes a second biasing element for biasing the venting valve to the valve closed position. The movement of the venting valve is responsive to a fuel nozzle being inserted into and removed from the fuel nozzle-receiving opening and responsive to a pressure condition in the fuel tank. The primary seal is movable from the sealed position overcoming the first biasing element in response to a vacuum condition in the fuel tank.

Other objects, advantages, and features will become apparent from the following detailed description, the accompanying drawings, and the appended claims.

DETAILED DESCRIPTION OF THE INVENTION

Figure 1:
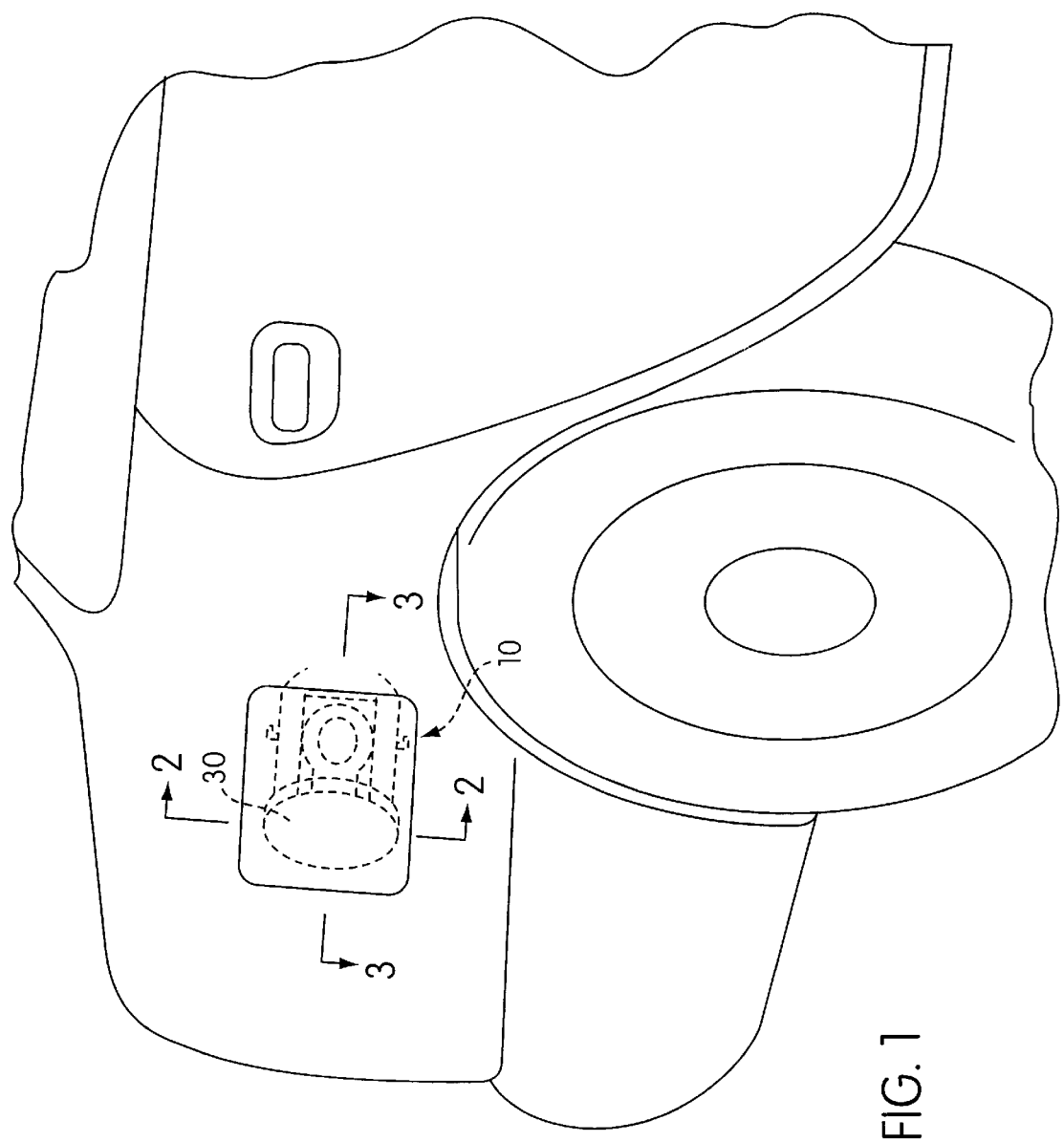
FIG. 1 is a perspective view of the outside of an automobile incorporating a capless refueling assembly embodying the principles of the present invention.
Figure 2:
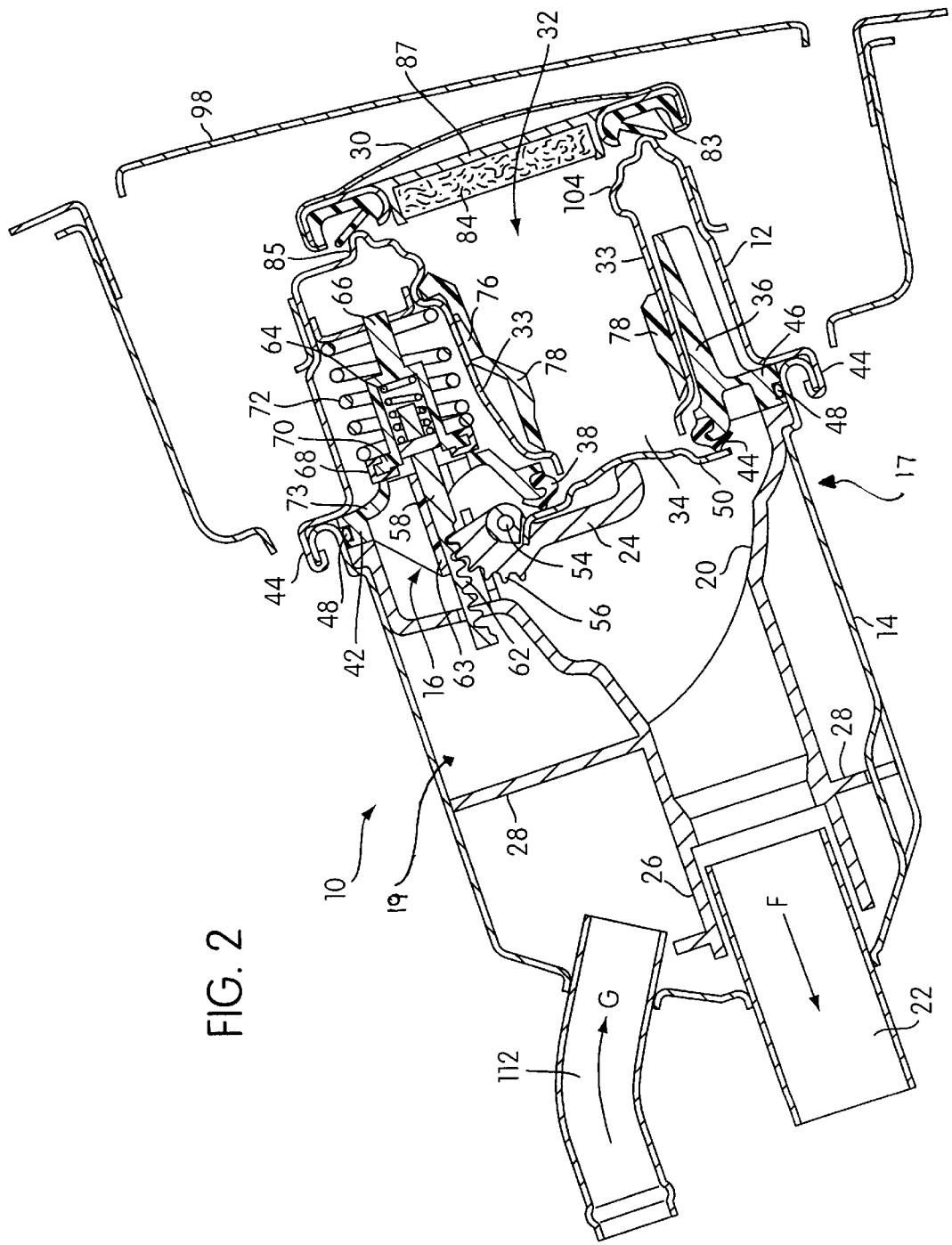
FIG. 2 is a longitudinal cross-sectional view taken along the line 2—2 in FIG. 1 and depicting a preferred embodiment of the capless refueling assembly of the present invention.
Figure 12:
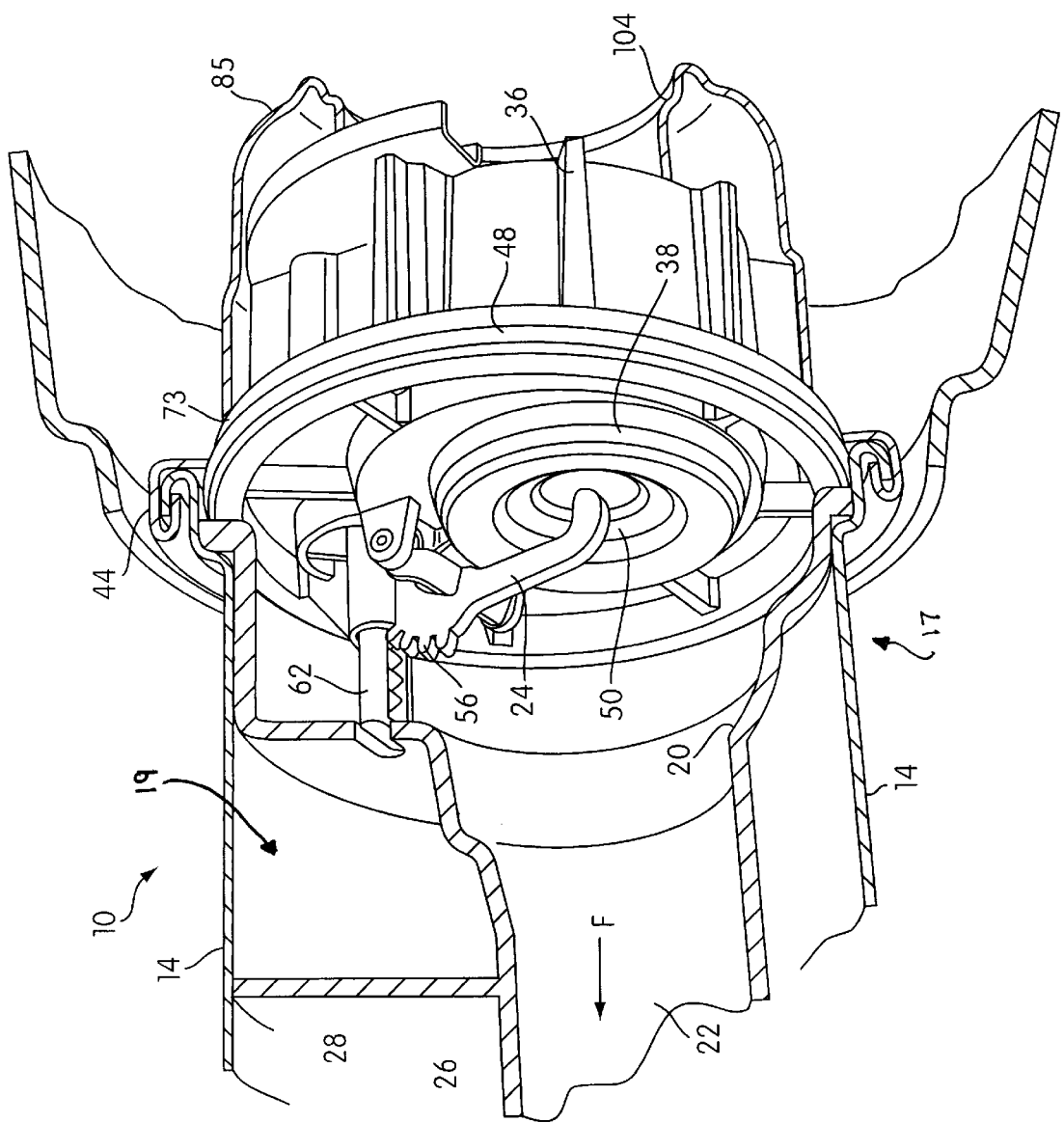
FIG. 12 of the drawings is a partial cross-sectional view of the assembly illustrated in FIG. 2 viewed from a perspective point within the motor vehicle.

Shown generally in FIG. 1 is a perspective view of a motor vehicle incorporating a preferred embodiment of a capless refueling assembly, generally indicated at 10, in accordance with the present invention. FIGS. 2–6 show this embodiment in greater detail and FIG. 12 shows a partial cross-sectional view of this embodiment taken from a perspective point within the motor vehicle. As shown in FIG. 2, the refueling assembly 10 is comprised of an outer housing portion 12, an inner housing portion 14, and a vapor venting valve 16. The outer and inner housing portions are coupled together to provide a housing assembly 17. A spiral labyrinth-type plastic structure, generally indicated at 18, is disposed within the inner housing portion 14, and has an internal funnel structure 20 that directs fuel into a filler pipe 22 and guides a fuel nozzle to its proper position for refueling. The funnel 20 of the structure 18 incorporates an L-shaped section that allows space for an engaging arm 24 to move when a fuel nozzle is inserted. The funnel 20 leads into a cylindrical extension 26 that overlaps the filler pipe 22. The external spiral shape of the structure 18 incorporates lateral extensions 28 extending outwardly from its walls to the inner surface of the inner housing portion 14. These lateral extensions 28 allow for the directing of fuel vapor around and upward to the vapor venting valve 16 where it can be released or recovered.

Figure 6:
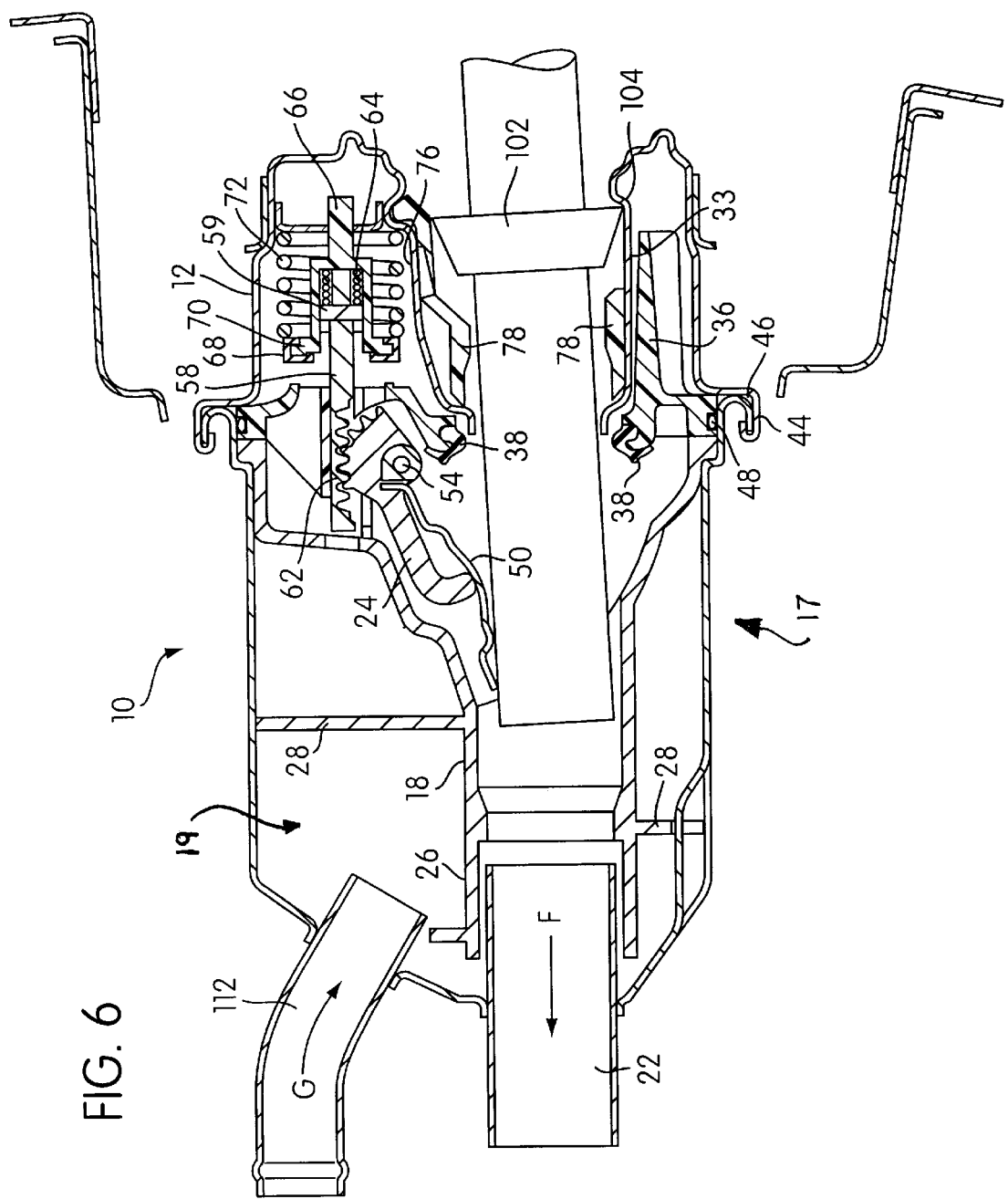
FIG. 6 is a cross-sectional view similar to FIG. 5, now with a fuel nozzle fully inserted in the refueling assembly.

The inner and outer housing portions 12, 14 are configured to provide a vapor flow path 19 when coupled together. The vapor flow path 19 extends helically through the spiral structure 18 and passes around the vapor venting valve 16 when the valve 16 is in its open or flow permitting position. The vapor flow path 19 is configured to allow fuel vapor to vent from the fuel tank when the vapor venting valve 16 is in its flow permitting position. The vapor venting valve 16 is movable between a closed or flow blocking position (FIG. 2) and a venting or flow permitting position (FIG. 6). In the flow blocking position, fuel vapor in the fuel tank is prevented from venting from the fuel tank through the vapor flow path 19. In the flow permitting position, fuel vapor in the fuel tank is permitted to vent from the fuel tank through the vapor flow path 19. As will be discussed in more detail below, the vapor flow path 19 may be configured to fluidly communicate to the atmosphere or to a fuel vapor absorbing canister onboard the vehicle.

The outer housing portion 12 incorporates pivotally mounted closure or dust lid 30 that covers fuel nozzle-receiving opening or mouth 32. The closure 30 is pivotally mounted for movement between (1) a closed or covering position wherein the closure 30 prevents debris from entering the housing assembly and (2) an open or access position wherein the fuel nozzle can be inserted into the nozzle-receiving opening 32. The pivotal mounting of the closure 30 is such that it can be moved between the closed or covering position and the open or access position without being separated from the housing assembly 17. Thus, the closure 30 cannot be lost or dropped during a normal refueling operation as can a removable fuel cap.

The nozzle-receiving opening 32 tapers into a narrow cylindrical passage 34. A generally cylindrical valve assembly housing 36 holds an annular seal 38 formed from a resilient material, such as rubber. The seal 38 extends circumferentially at the passage 34. As can be appreciated from FIG. 3, a semi-circular channel structure 39 is fixed to the housing 36 by conventional fasteners. The housing 36 is formed from a plastic material.

As shown in FIG. 2 the outer housing portion 12 and the inner housing portion 14 are connected at a crimped flange connection, generally indicated at 44, to form the housing assembly 17. This connection can alternately be formed by a weld or any other conventional means. The valve assembly housing 36 defines a peripheral O-ring groove 46 for receiving an O-ring 48. The O-ring extends annularly between the housing 36 and the inner wall of the inner housing portion 12, providing a gas tight seal therebetween.

The vapor venting valve 16 is operatively associated with a primary sealing structure in the form of a flap valve structure 50, which is held against the main seal 38 by the engaging arm 24. Engaging arm 24 pushes the flap valve structure 50 upwards at its center to provide an evenly distributed pressure against the annular main seal 38. The arm 24 has an integrally formed hinge pin 54 that is received within a pair of spaced mounting arms 55 disposed on opposite ends of the pin 54 and integrally formed with valve assembly housing 36. The pin 54 serves as a pivot axis for the engaging arm 24. As shown in the Figures, the rear portion of arm 24 is arcuately shaped with gear teeth 56 spaced along its edge. A valve actuating rod 58 has a series of gear teeth 62 that intermesh with the gear teeth 56 of engaging arm 24. The actuating rod 58 extends through a generally tubular wall 63 of housing 36.

It is to be understood that the primary sealing structure need not be a flap valve structure. The primary sealing structure may be a valve which slides axially within the housing assembly in response to insertion of a fuel nozzle, such as that disclosed in U.S. Pat. No. 5,056,570, the entirety of which is incorporated herein by reference. All that is needed is a primary sealing structure which is movable between (1) a sealed position wherein the nozzle-receiving opening 32 is sealingly closed and (2) an open position wherein the nozzle-receiving opening 32 is open.

The actuating rod 58 has an enlarged diameter portion 59 that is received within the interior of a top-hat shaped valve member 66. The enlarged diameter portion is cylindrical in configuration and slidably engages the interior surface of the valve member 66. A relatively weak biasing element or coil spring 64 is disposed in surrounding relation to an upper portion of the rod 58 and within the interior of the top-hat configuration of the valve 66, above the enlarged diameter portion 59. The upper annular surface of the enlarged diameter portion 59 serves as a seat for the lower end of coil spring 64. The opposite end of the spring 64 engages the interior surface of the circular end wall of the valve 66. The spring 64 functions to bias the rod 58 downwardly, thus biasing the engaging arm 24 into a position wherein it maintains the flap valve structure 50 in its sealed or closed position against annular seal 38.

The periphery of the brim portion or flange of the top-hat shaped valve 66 has an annular valve seal 68 crimped therearound. A biasing element or coil spring 72, which has is relative stronger (i.e. a relatively stronger spring constant K) than the spring 64, is engaged with an interior surface of the outer housing portion 14 and holds the valve 66 and the valve seal 68 thereof against an annular ridge 73 defining an opening in the valve housing 36. The stronger coil spring 72 has a higher spring constant than the weak coil spring 64. This forms a gas tight seal between the interiors of the outer housing portion 12 and the inner housing portion 14. A second seal between these housing portions 12,14 is formed by the flap valve structure 50.

The nozzle-receiving opening 32 is generally defined by a tubular wall portion 33 of the upper housing assembly 12, and a generally tubular insert 78 disposed within the tubular wall portion 33. The wall portion 33 and the insert 78 each have a lateral opening or hole, which are disposed in alignment with one another, as indicated at reference numeral 76. The aligned openings 76 vent to atmosphere any fuel vapors that are permitted to bypass valve 66 during a refueling operation.

The closure 30 is configured to permit air to flow into the housing assembly when in the covering position. Particles are filtered from the air as it flows through the closure. The periphery of the closure 30 comprises a rigid plastic, annular structure 82, which seats a resilient (preferably rubber) annular sealing member 83. The sealing member 83 is constructed and arranged to form a seal with a ridge 85 formed on the outer housing portion 12 and surrounding the nozzle-receiving opening 32. The closure 30 further comprises a rigid circular wall portion 87 attached at its periphery to the annular rigid structure 82. The circular wall portion 87 has a plurality of small pin holes therethrough. A circular particle filter member 84 is fixed in sealed relation within the interior of the annular rigid structure, immediately beneath the circular wall 87. The filter member prevents air contaminants from entering the system during a vacuum condition as will be described.

Figure 3:
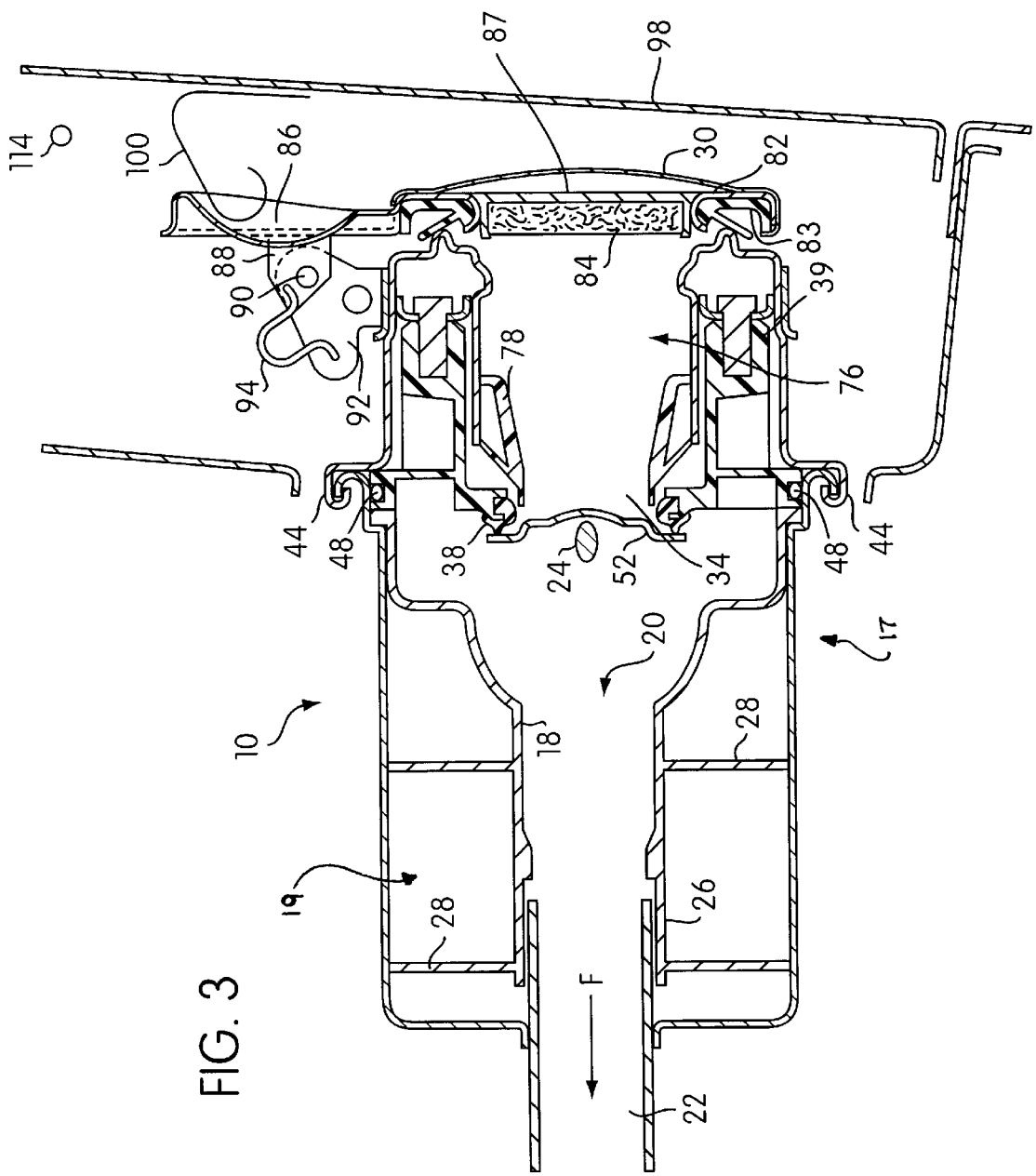
FIG. 3 is a longitudinal cross-sectional view taken along the line 3—3 in FIG. 1 and depicting the preferred embodiment of the present invention rotated 90° with respect to the cross-sectional view of FIG. 2.

As shown in FIG. 3, closure 30 further includes a lateral extension 86, which is connected to the rigid annular structure 82 and extends radially outwardly beyond the generally circular configuration of the closure 30. The extension carries a mounting bracket 88, and a cap hinge pin 90 runs through both the bracket 88 and a hinge structure 92. The hinge structure 92 is rigidly fixed to the upper housing assembly 12. A toggle spring 94 has one end thereof fixed to the bracket 88 and the opposite end thereof fixed to the hinge structure 92.

When the closure 30 is in a covering position, the toggle spring 94 exerts an outward force on the bracket 88 that biases the closure 30 for rotation in the clockwise direction around the hinge pin 90 (as appearing in the figures), thus maintaining the closure 30 in the covering position. It can be appreciated, however, that the toggle spring 94 operates as an over-center spring. Thus, when the closure 30 is rotated counterclockwise (manually or otherwise) against the bias of spring 94 (see FIG. 4), it eventually reaches the over-center position, and thereafter will operate to biases the closure 30 towards the access position. The spring 94 thus holds the closure 30 in the access position during a filling operation.

Figure 4:
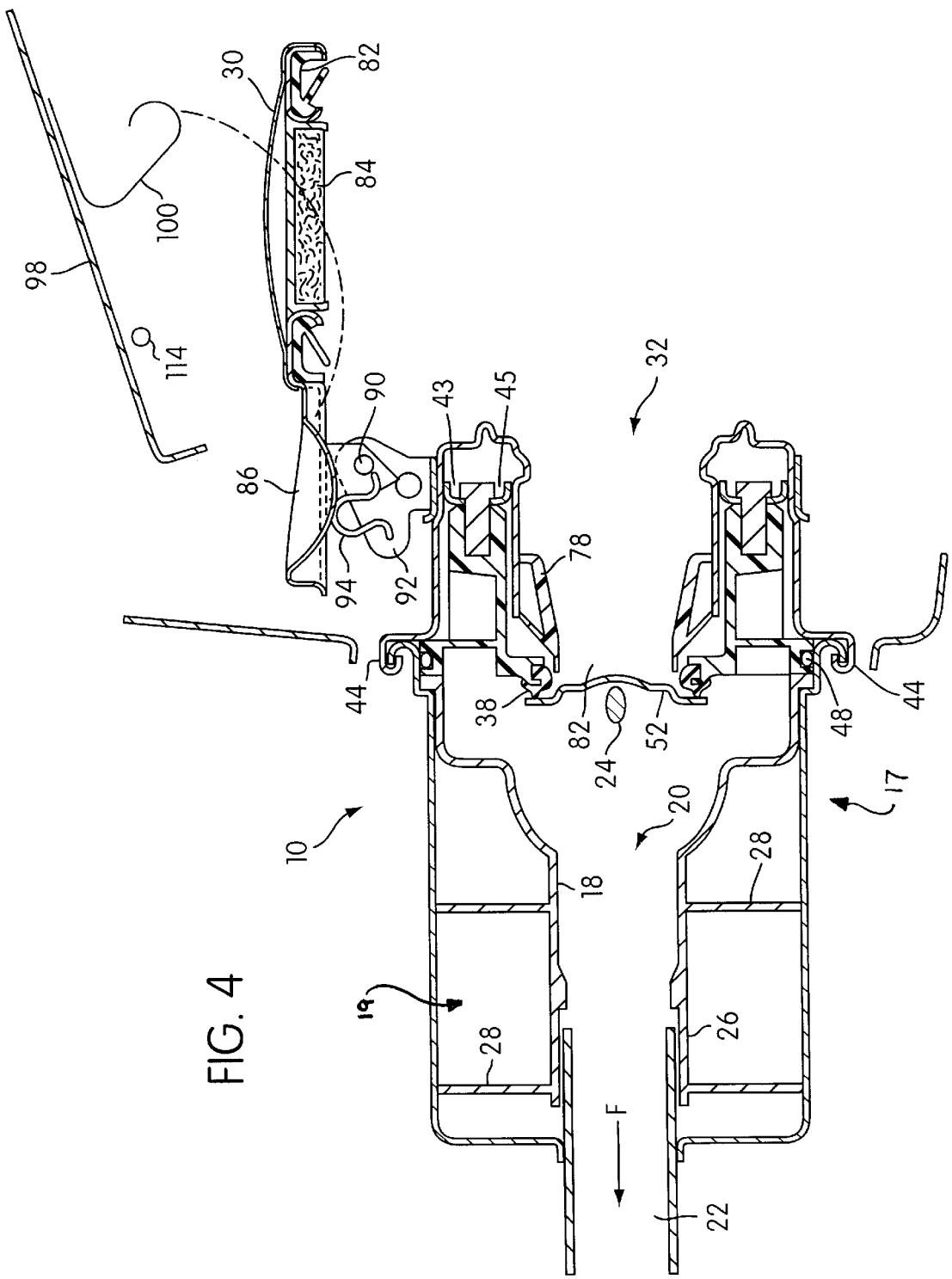
FIG. 4 is a cross-sectional view similar to FIG. 3 with the fuel door and closure structure in an access position.

As also shown in FIG. 4, an outer refuel door 98 is conventionally hinged to the exterior of the vehicle body. A spring steel extension 100 is attached to the interior of refuel door 98, and allows for a one step procedure in closing the refuel door 98 and the closure 30. That is, although the closure 30 can itself be closed (e.g., by manual operation), the closure 30 can be automatically closed simply by closing the outer door 98, as the steel extension 100 attached to the refuel door 98 will engage the closure 30 at least until it passes the over-center position, whereupon the force of spring 94 will take over for completing closure of closure 30 to the covering position.

Figure 5:
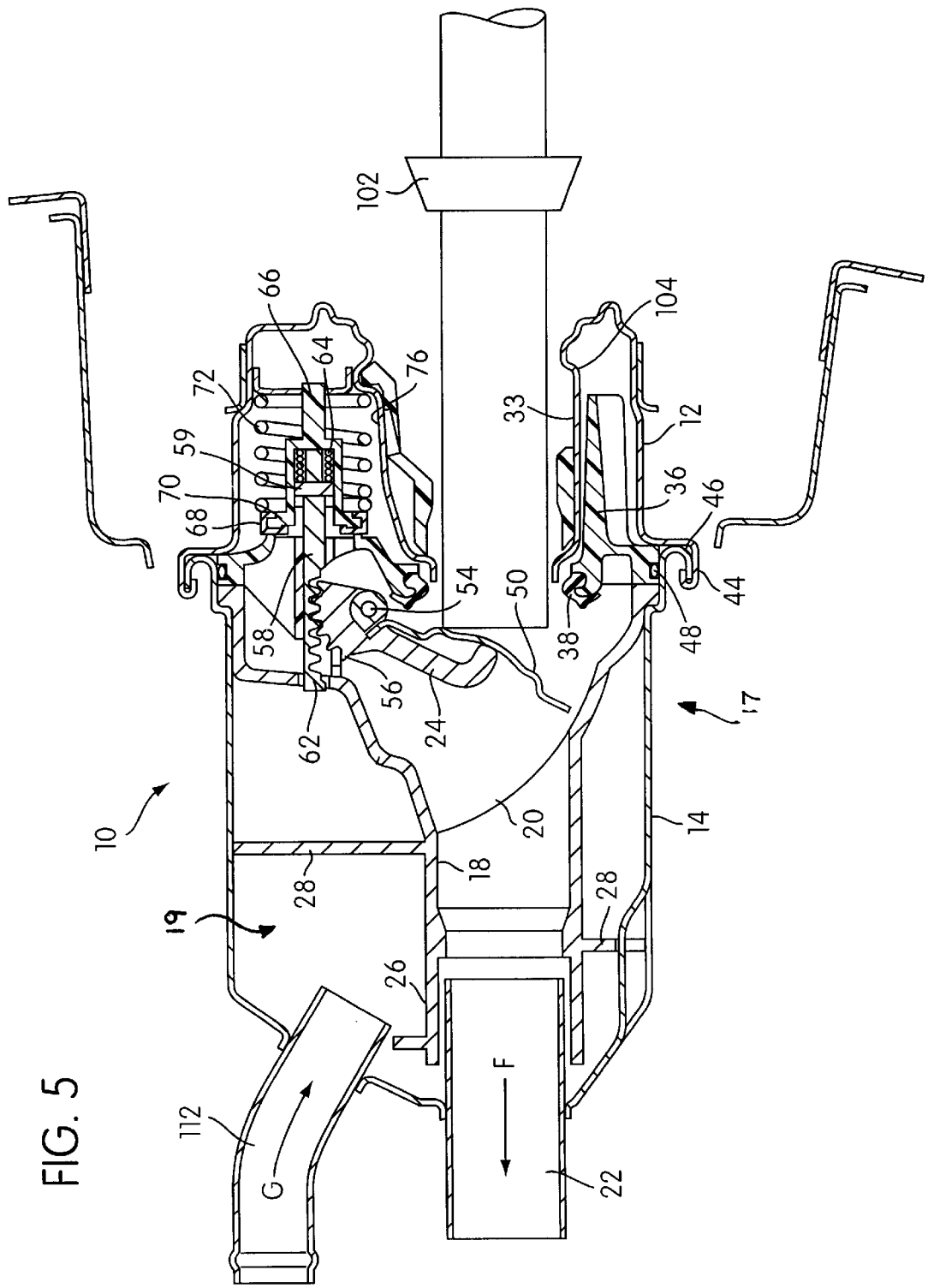
FIG. 5 is a cross-sectional view similar to FIG. 2, with a fuel nozzle partially inserted in the refueling assembly.

As shown in FIG. 5, as a fuel nozzle is inserted into the refueling assembly 10, the flap valve structure 50 is pushed inward, pivoting the engaging arm 24 about the hinge pin 54 to thereby force actuating rod 58 upwardly via the rack and pinion gear teeth arrangement of intermeshed teeth.

FIG. 6 shows the fuel nozzle fully inserted. As shown, the fuel nozzle has a conventional frusto-conical annular locking ring 102. The inner wall portion 33 of the inner housing portion 12 is provided with a radially inwardly protruding portion 104 which cooperates with the upper end of the tubular insert 78 to form a firm locking connection with the locking ring 102 as required by SAE standards.

Referring back to FIG. 2, it can be appreciated that this figure shows the capless refueling assembly in a closed, sealed condition. The flap valve structure 50 forms a seal with annular seal 38, and the vapor venting valve 16 is also in a flow blocking position. As fuel is consumed, a vacuum builds inside the fuel tank. When the vacuum reaches a sufficient level to overcome the biasing of the weaker spring 64, the flap valve structure 50 is pulled down against the bias of spring 64 to a vacuum relief position. The engaging arm 24 rotates about the hinge pin 54, and the intermeshing of teeth 56 of the arm 24 with teeth 62 of the rod 58 results in slight upward movement of the rod 58. Once the flap valve structure 50 is opened slightly to the vacuum relief position, environmental air is then sucked in through the holes in the end wall 87 and through filtering member 84 until the vapor pressure increases and the vacuum is dissipated and the flap valve structure 50 is again closed under the force of spring 64. It should be appreciated that during this operation, the actuating rod 58 is not extended upwardly a sufficient distance to enable the upper end thereof to engage the circular end wall of the valve 66, thus the movements take place without moving vapor venting valve 16 from its flow blocking position.

At a predetermined extreme over-pressurization condition within the fuel tank, the upward force applied to valve 66 of vapor venting valve 16 by the vapor pressure becomes sufficient to compress the stronger coil spring 72, thus allowing the valve 66 to move upward to its flow permitting position so as to release the vapor pressure. The released fuel vapor is vented through the holes 76, through the filtering member 84, and through the holes in the closure 30. If the vapor pressure is sufficiently great, the closure 30 may be lifted to assist exhausting of the fuel vapors.

Preferably, the movable components of the capless refueling assembly 10 are well balanced about the axis of rotation about pin 54. By balancing the movable components, the capless refueling assembly 10 is effectively incapable of intermittent partial opening. In other words, the capless refueling assembly 10 of the present invention will maintain a sealed condition even when exposed to significant vertical g-forces, as would be experienced during driving along rough roads or over potholes.

Referring back to FIG. 4, operation of the capless refueling assembly 10 begins with the opening of the outer door 98 in any conventional manner. The closure 30 can now be moved to its access position by pulling it open by hand or in any conventional manner, and pivoting it about the hinge pin 90 until it passes the over-center point for the toggle spring 94. At that point, the force of toggle spring 94 is applied in reverse so that the closure 30 is held open in its access position, as shown in FIG. 4.

FIG. 5 shows a fuel nozzle partially inserted in the fuel system 10. As the flap valve structure 50 moves to its open position, the engaging arm 24 rotates about the hinge pin 54. The gear teeth 56, being intermeshed with the actuating rod gear teeth 62, move the actuating rod 58 upwards, compressing the weak spring 64. Continued insertion of the fuel nozzle causes continued pivoting of engaging arm 24 until the upper end of the actuating rod 58 engages the circular wall portion of the valve 66. This physical engagement causes the valve 66 of the vapor venting valve 16 to be moved upwards against the resistance of the strong spring 72 and towards the flow permitting position. The gas tight seal between the ridge 73 formed on 36 and the seal 68 of valve 66 is released as the vapor venting valve 16 moves to its flow permitting position, allowing fuel vapor to escape from the inner housing portion 12 to the outer housing portion 14 through the opening sealed by valve 66. In addition, vapor is permitted to escape to atmosphere through aligned openings 76 and around the periphery of the fuel nozzle during a fueling operation. In particular, in addition to the fuel coming upwards directly from the tank from the filler pipe 22, additional vapor rises through the separate fuel vapor vent tube 112, traveling both axially and circumferentially around the extensions 28 forming the spiral structure 18, up through the valve 66 and openings 76 into the atmosphere.

The spiral structure 18 functions as a vapor separating structure and guides the flow of vapor in a helical path to discriminate the liquid droplets and bubbles from gaseous fumes prior so the most, if not all, of the liquid is removed before it reaches valve 66. The spiral structure 18 provides the vapor flow path 19 with a tortious portion extending helically within the housing assembly. The tortious portion is configured such that the fuel vapor flowing through the vapor flow path flows both circumferentially and axially with respect to the housing assembly 17 so that the heavier liquid droplets are separated from the lighter fuel vapor by virtue of centrifugal force and/or inertia based events as the fuel vapor flows through the tortious portion.

As the fuel nozzle is removed, the force from the strong spring 72 pushes the valve 66 down and compresses the valve seal 68 against the annular ridge 73 to regain the gas tight condition and place the vapor venting valve 16 in its flow blocking position. The force of the weak spring 64 continues to urge the actuating rod 58 inwardly. The movement of engagement teeth 62, causes the engagement teeth 56 and engaging arm 24 itself to pivot counterclockwise (as seen in the figures)on the hinge pin 54. This movement in turn forces the flap valve structure 50 to its closed position, to form a gas tight condition against the annular seal 38 and prevent fuel vapors from escaping to the atmosphere through the nozzle-receiving opening 32. To close the closure 30, the closure 30 is pivoted, manually or otherwise, until the toggle spring 94 over-center point is reached, at which point, the force of the toggle spring 94 will close the closure 30 and hold it in its covering position. Alternatively, the refuel door 98 and closure 30 can both be closed in a single motion—by simply shutting the refuel door 98 which, in turn, closes the closure 30 shut.

Figure 7:
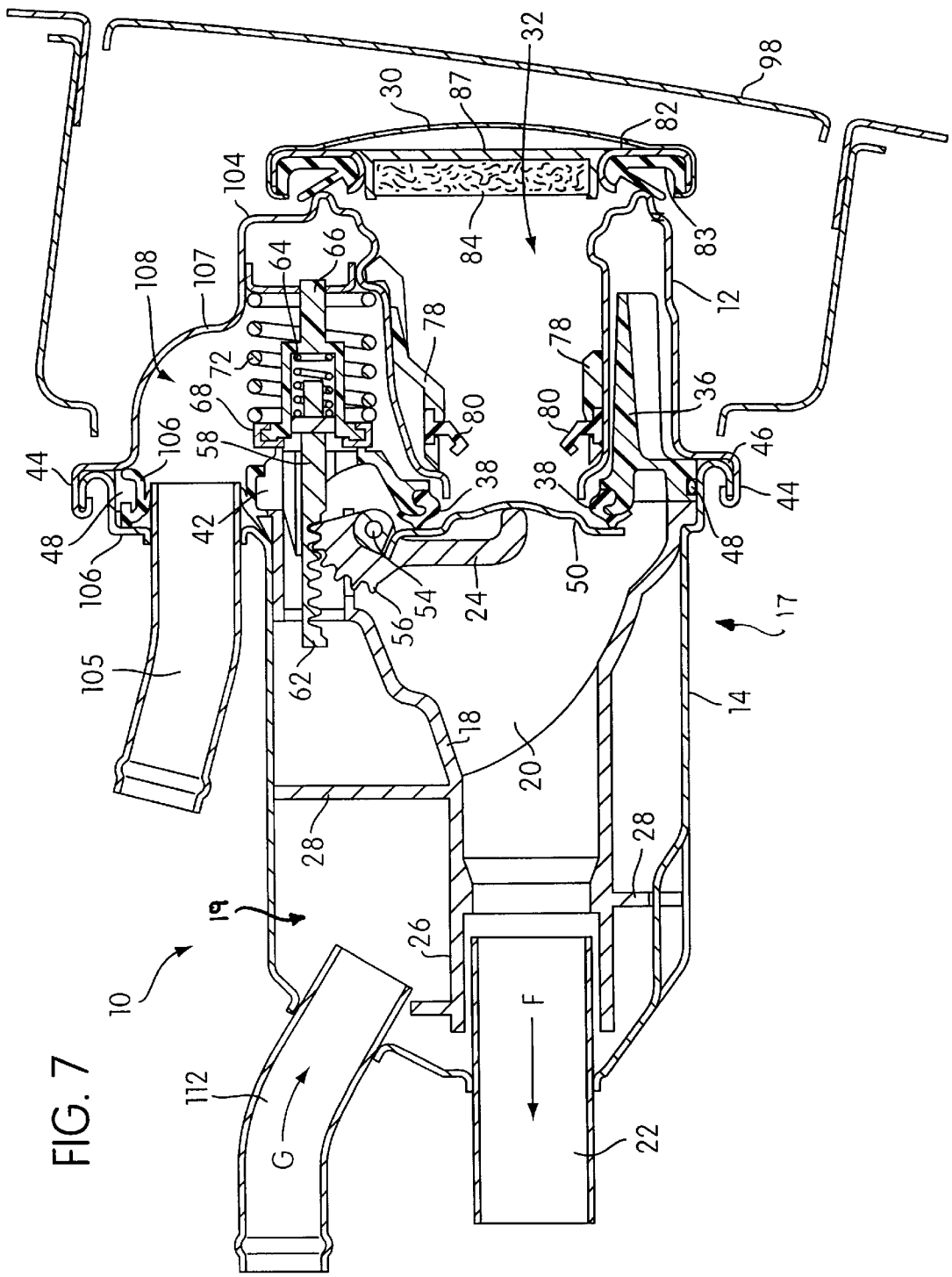
FIG. 7 is a cross-sectional view of a second embodiment of the capless refueling assembly, incorporating an ORVR system, and showing the closure structure and the fuel door in a closed position.

FIG. 7 shows a second embodiment of present invention which incorporates an on board refueling vapor recovery (ORVR) system. Basically, the ORVR system is a temporary absorption device mounted within the vehicle for processing fuel vapors. The vapor flow path 19 is fluidly communicated with the ORVR system rather than the atmosphere in this embodiment. In FIG. 7, components which are common or similar with the first embodiment are designated with the same reference numerals. Indeed, the construction and operation of the embodiment of FIG. 7 is substantially identical with that described above with the following exceptions.

In this second embodiment, the capless refueling assembly 100 has an upper housing assembly 12 provided with a laterally disposed, somewhat tubular wall portion 107. This wall portion 107 incorporates the crimped connection 44 that connects the inner housing portion 12 with the outer housing portion 14 to define a housing assembly 17. The tubular wall portion 107 defines an opening 108 in the inner housing portion 12. The mouth of opening 108 is substantially circular, and is constructed and arranged to receive a tubular fuel recovery vent tube 105. An annular grommet or seal 106 forms a peripheral seal between the upper end of the vent tube 105 and the lower end of the tubular wall portion 107.

In this second embodiment, openings 76 are not provided. In addition, the plastic tubular insert 78 mounts a resilient, preferably rubber annular sealing structure 80, which is constructed and arranged to sealingly engage the exterior surface of a filler nozzle that has been inserted into the opening 32.

Figure 8:
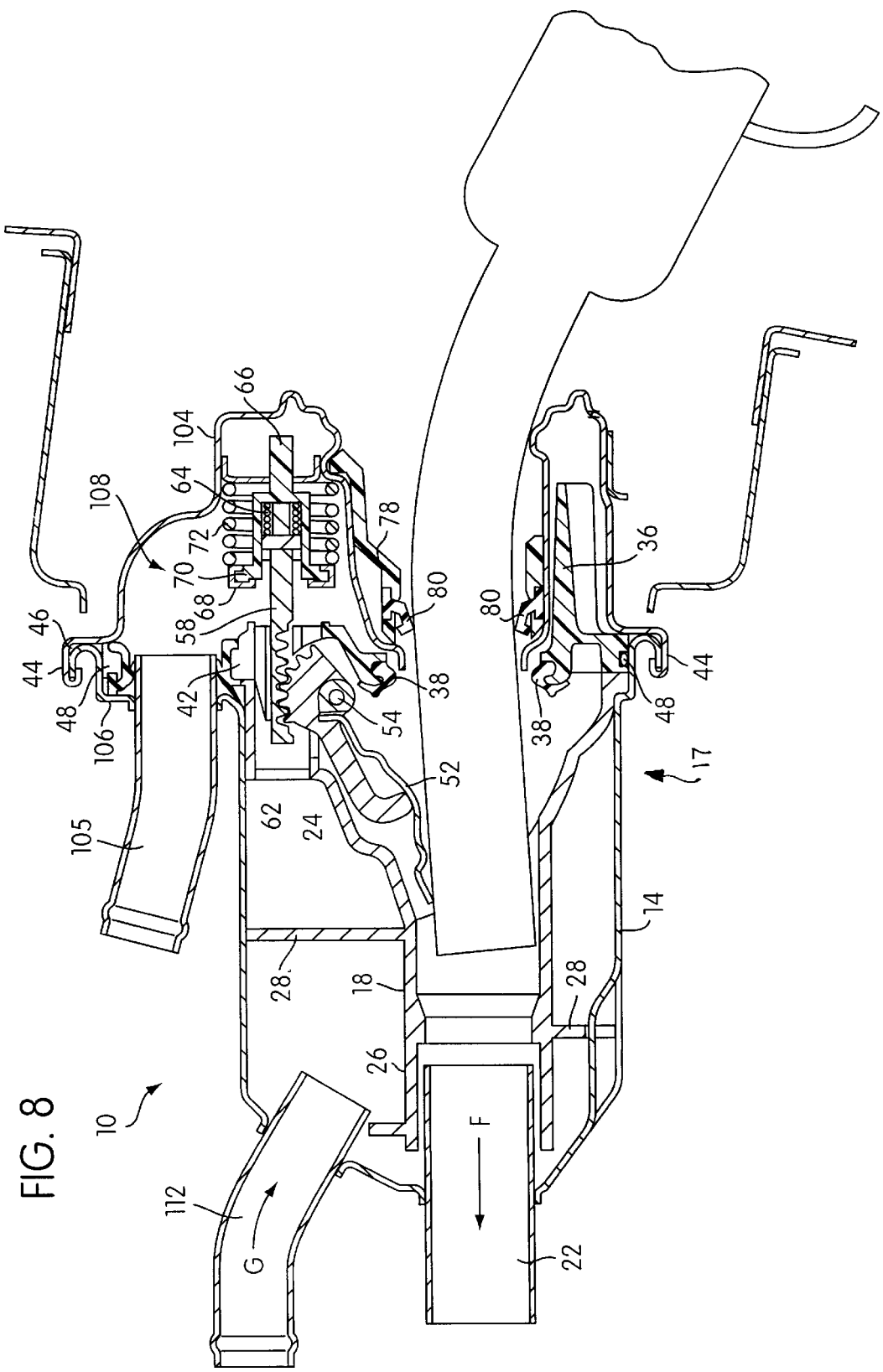
FIG. 8 is a cross-sectional view similar to FIG. 7, with a fuel nozzle fully inserted in a refueling operation, and the closure structure and fuel door in an access position.

FIG. 8 shows the second embodiment with a fuel nozzle fully inserted. Note the gas tight seal formed by the guide seal 80 which facilitates fuel vapor recovery through the tube 105, instead of venting fuel vapor to atmosphere.

During operation, the second embodiment of the capless refueling assembly, as shown in FIGS. 7 and 8, operates essentially like the first embodiment. However, during a refueling operation, when the valve 66 is opened, fuel vapors passing upwards through the vapor flow path 19 travel through the opening 108 formed in outer housing portion 12, and then into the ORVR vent tube 105. The vapor flow path is thus fluidly communicated with the ORVR system in order to provide for processing of the fuel vapors. The vent tube 105 leads to a conventional carbon canister (not shown) for trapping or temporarily storing the fuel vapors.

The annular seal 80 formed with the filler nozzle prevents vapors from escaping around the periphery of the nozzle to atmosphere. It is contemplated that the annular seal could be omitted and a "fluid seal" could be utilized instead. A fluid seal is created by fuel rushing out of the end of the nozzle into the filler pipe 22. A venturi effect is developed providing a low pressure region within the housing assembly 17. The diameter of the nozzle-receiving opening is close to the diameter of the nozzle which allows air to flow into the housing assembly 17 in response to the relatively lower pressure therein. As liquid fuel is supplied to the fuel tank to the fuel nozzle, air is drawn in about the nozzle and the air flows downwardly to the fuel tank. This downward flow of air prevents fuel vapors from flowing upwardly and escaping to the atmosphere through the nozzle-receiving opening 32. It is to be understood that, although the differences between a fluid seal and a mechanical seal are quite substantial, it is within the scope of the present invention to use either kind. However, the fluid seal is actually preferred because of its superior durability insofar as it has no structural components which suffer wear and tear as does the sealing structure 80 of the mechanical type.

Figure 9:
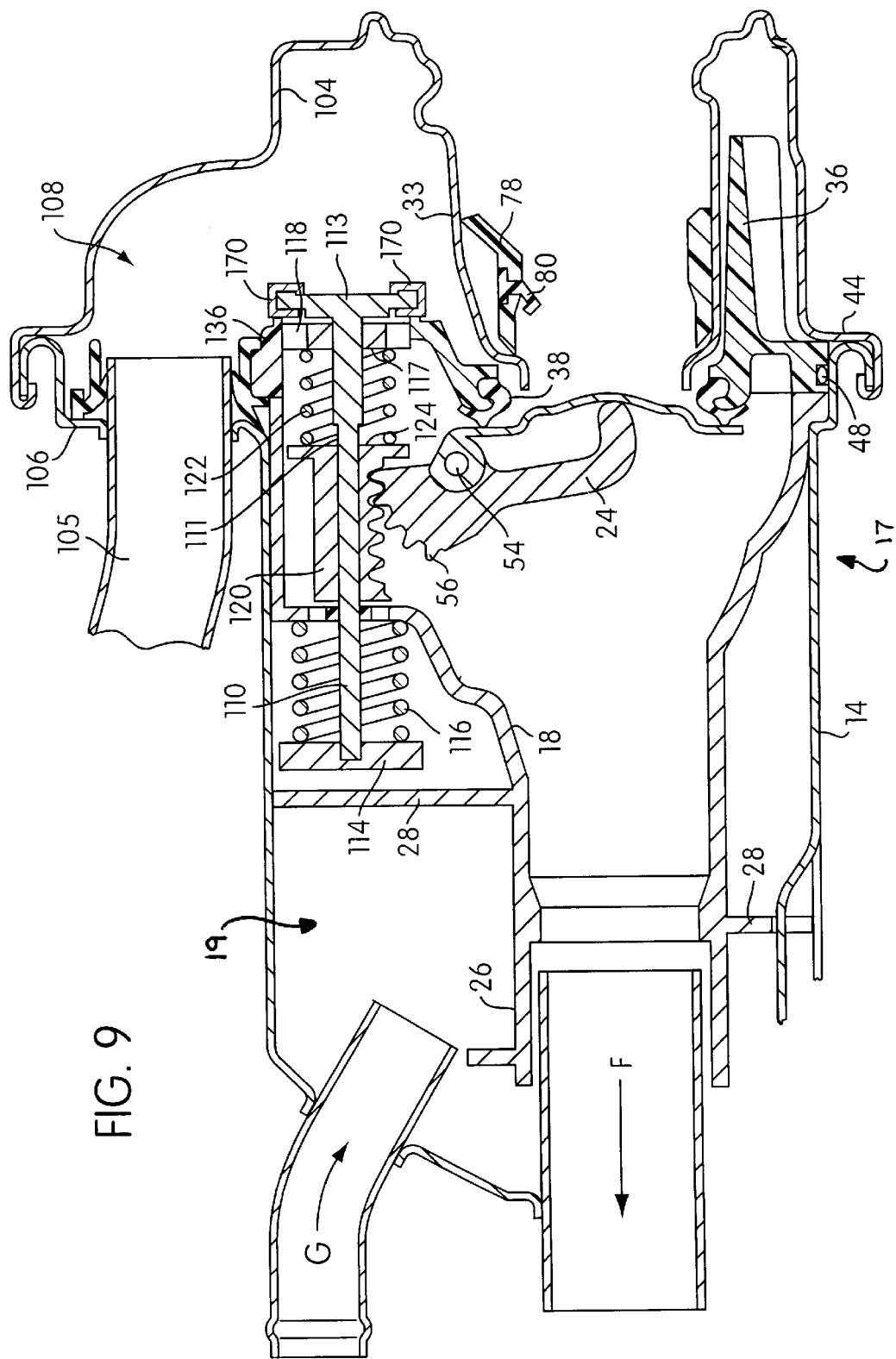
FIG. 9 of the drawings is an enlarged cross-sectional view of an alternate design of the present invention, with the valve engaged to create a vacuum.

Shown in FIG. 9 is a second embodiment of the vapor venting valve 16, designed to protect the seal formed by this valve in the event of an impact. In this embodiment of the vapor venting valve 16, a seal member 166 has an elongated rod extension portion 110 formed integrally therewith, with discs 112 and 114 on either end. The seal member 166 has, in essence, taken the place of the actuating rod 58 and valve 66 of the previous embodiments. A relatively stronger spring 116 is positioned at the bottom of the seal 166 and engaged with an interior surface of the spiral structure 18, pulling the seal member 166 downward.

A movable toothed portion 120 surrounds a portion of the elongated rod portion 110 of seal member 166. The elongated rod portion 110 has a flange portion 111 that leaves a slight gap between the circular end face 124 of the movable toothed portion 120. The gap permits slight relative movement between the elongated rod portion 110 and the toothed portion 120 before the toothed portion 120 moves upwardly sufficiently to cause movement of the elongated rod portion 110.

The valve housing 136 has a valve stem receiving sleeve portion 117, which is surrounded by a plurality of circumferentially spaced openings 137 in the housing 136. The alternating tabs or solid portions which alternate with the openings 137 serve as a seating surface for a weak spring 122 positioned above the rod portion 110.

During a vacuum condition, the flap valve structure 50 is pulled downwardly against the bias of weak spring 122 to a vacuum relief position so as to allow atmospheric air to enter. The rod 110 or valve 166 will not move because the end face 124 of the member 120 will not engage flange 111 of the rod. On the other hand, during a filling operation a pressure condition will be created, the flange 111 is engaged by end face 124, and the elongated rod portion 110 is pushed upwards against the force of strong spring 116 until the seal 170 of the valve 166 becomes unseated, thus permitting fuel vapor to be vented.

Figure 10:
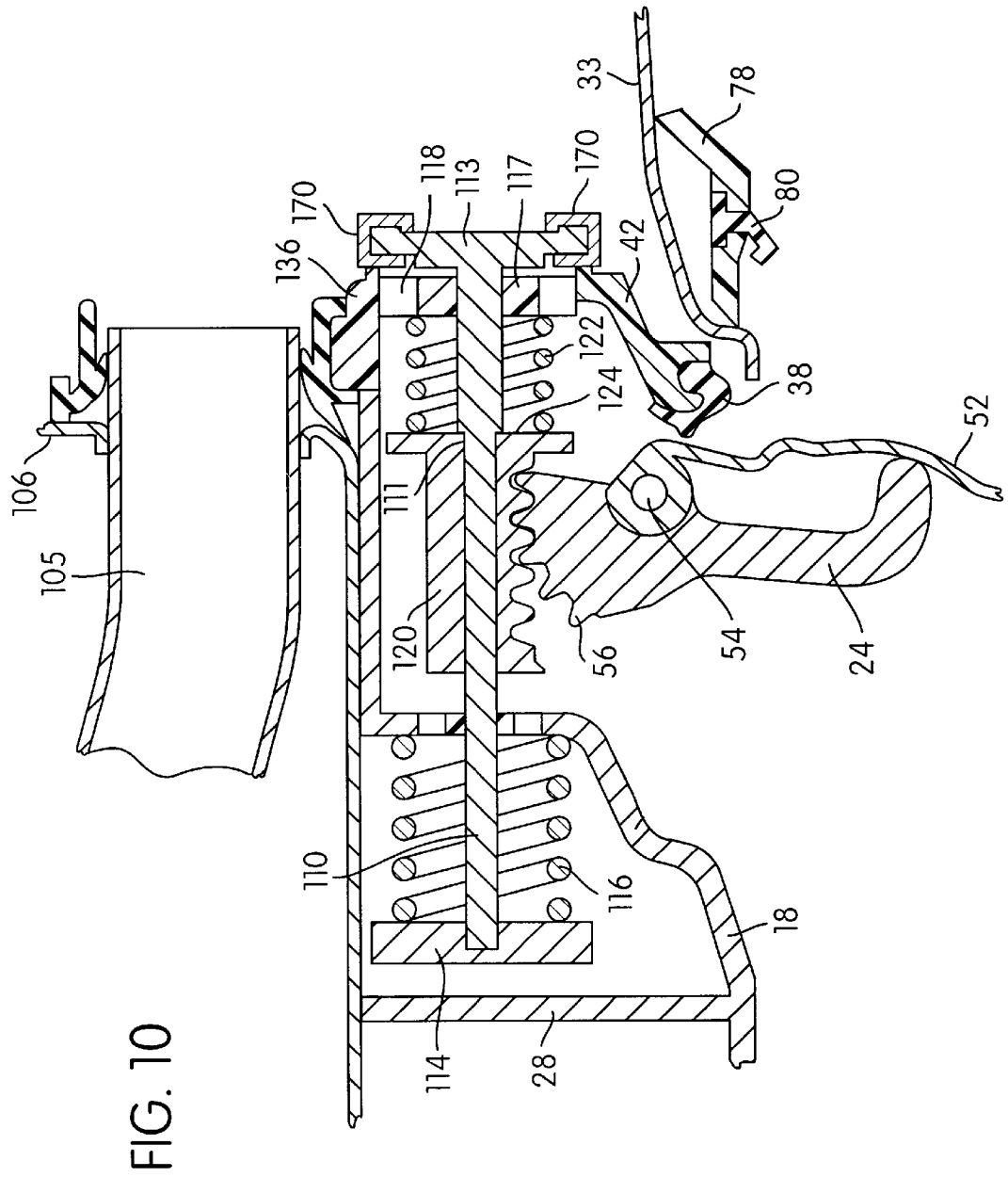
FIG. 10 of the drawings is an enlarged cross-sectional view similar to FIG. 9 of the alternate design, with the valve partially opened to a vacuum relief position so as to release the vacuum.
Figure 11:
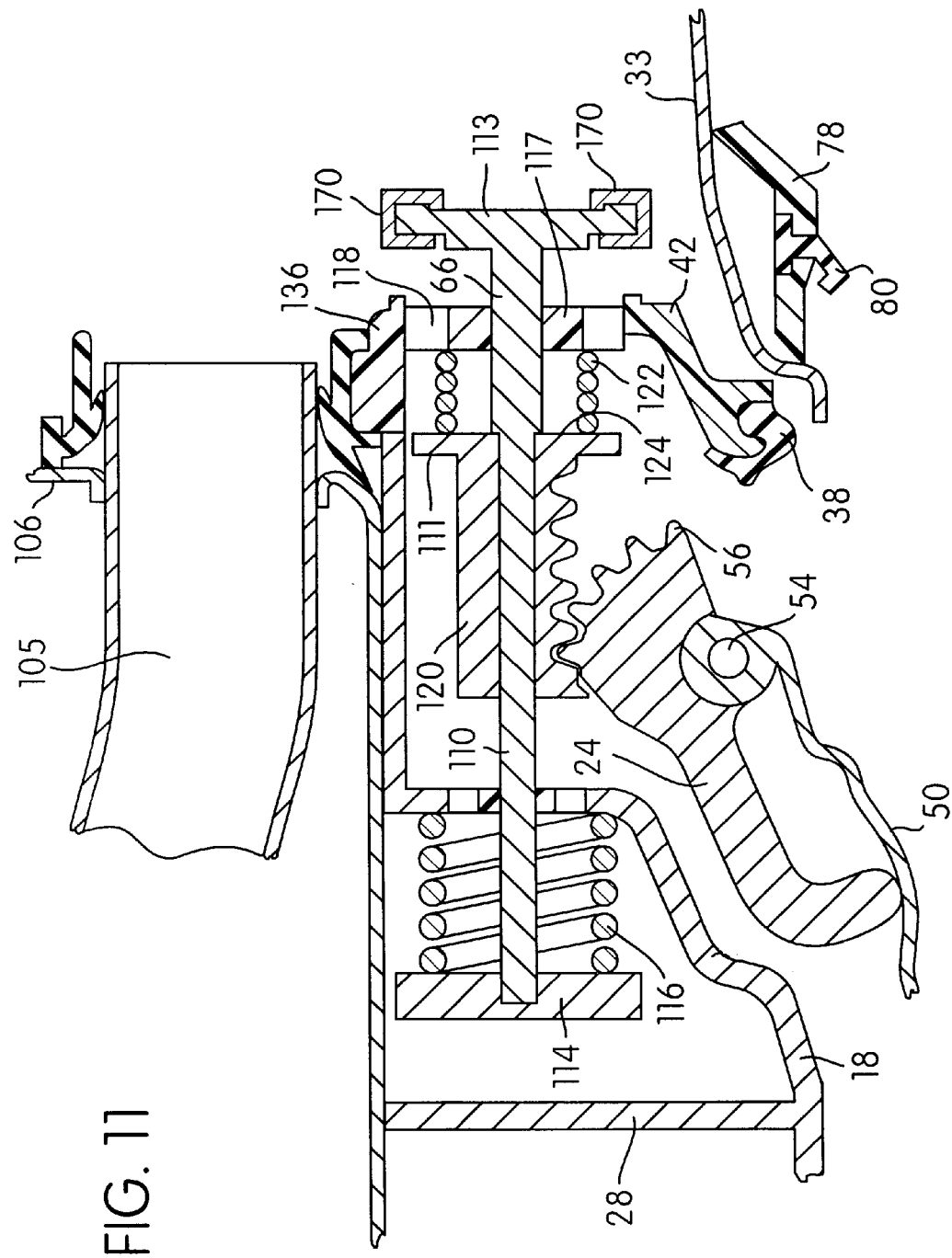
FIG. 11 of the drawings is an enlarged cross-sectional view similar to FIG. 9 of the alternate design, with the valve fully opened to facilitate refueling via a fuel nozzle.

The arrangement in FIGS. 9–11 can be used with or without an ORVR system. An ORVR tube 105 is shown in the Figures. The construction in accordance with FIGS. 9–11 is advantageous in that it permits the entire seal structure, e.g., seal 170, to be positioned lower in the fuel system, thus being further out of the way in the event of a side impact.

The embodiments of the present invention disclosed herein are intended to illustrate the structural and functional principles of the present invention. The principles of the present invention are not limited to these disclosed embodiments but, on the contrary, are intended to encompass all modifications, variations, and equivalents which fall within the scope of the appended claims.

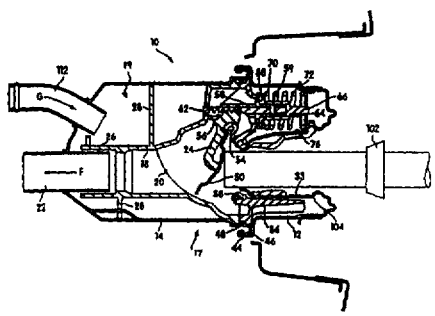

What is claimed:

1. A capless refueling assembly for a motor vehicle fuel tank, said capless refueling assembly comprising:
    a housing assembly having a nozzle-receiving opening in fluid communication with the fuel tank such that a fuel nozzle can be inserted in said nozzle-receiving opening and supply liquid fuel to the fuel tank;
    a primary seal mounted within said housing assembly for pivotal movement between a sealed position wherein said primary seal sealingly closes said nozzle-receiving opening and an open position, said pivotal movement being responsive to a fuel nozzle being inserted into and removed from said nozzle-receiving opening;
    a closure pivotally mounted to said housing assembly for movement between a covering position wherein said closure covers a mouth of the nozzle-receiving opening and an access position wherein a fuel nozzle can be inserted into said nozzle-receiving opening;
    a vapor venting valve cooperatively engaging the primary seal for cooperative movement therewith, said cooperative engagement including a first biasing element for biasing the primary seal to the sealed position, said venting valve movable between a venting position wherein fuel vapor in the fuel tank is permitted to vent from the fuel tank through a vapor flow path and a valve closed position wherein fuel vapor in the fuel tank is prevented from venting through said vapor flow path, said venting valve including a second biasing element for biasing the venting valve to said valve closed position, said movement of the venting valve in response to a fuel nozzle being inserted into and removed from said fuel nozzle-receiving opening and in response to a pressure condition in the fuel tank, and said primary seal being movable from the sealed position overcoming said first biasing element in response to a vacuum condition in the fuel tank.

2. A capless refueling assembly according to claim 1, wherein said first biasing element is relatively weak relative to the second biasing element such that primary seal is movable from said sealed position without overcoming the second biasing element.

3. A capless refueling assembly according to claim 2, wherein said vapor venting valve comprises a valve member having an interior space formed therein, an actuating rod having an outer end slidably engaging said valve member and extending into said interior space, said first biasing element extending between said actuating rod and said valve member within said interior space, and said second biasing element extending between said valve member and an interior surface of said housing assembly.

4. A capless refueling assembly according to claim 3, wherein said primary seal has a set of gear teeth engaging a complementary set of gear teeth on a stem of the vapor venting valve.

5. A capless refueling assembly according to claim 4, wherein said housing assembly is constructed and arranged to be mounted on an end of a vent tube connected to the fuel tank such that said housing assembly is in fluid communication with the fuel tank via the vent tube.

6. A capless refueling assembly according to claim 5 wherein said housing assembly is configured to be in fluid communication with a filtration device disposed in the motor vehicle such that vapor vented from the fuel tank flows through said vapor flow path to the filtration device.

7. A capless refueling assembly according to claim 6, wherein said closure includes an over-center biasing element for biasing the closure towards said access position and towards the covering position.

8. A capless refueling assembly according to claim 7, wherein said closure has holes permitting flow therethrough.

9. A capless refueling assembly according to claim 8, wherein said closure is constructed and arranged to move from said access position thereof to said covering position thereof in response to closing of an exterior refueling door on the body of the motor vehicle.

10. A capless refueling assembly according to claim 5, further comprising vapor separating structure disposed in said housing assembly, said vapor separating structure providing said vapor flow path with a tortious portion extending helically within said housing assembly separating liquid droplets from said fuel vapor by virtue of centrifugal force as the fuel vapor flows through said tortious portion.

11. A capless refueling assembly according to claim 10, wherein said primary seal is a flap valve pivotally mounted within said housing assembly.

12. A capless refueling assembly according to claim 11, wherein the housing assembly has an opening for venting to the atmosphere.

13. A capless refueling assembly according to claim 11, further comprising an annular sealing structure for sealingly engaging an exterior surface of the fuel nozzle received in said fuel nozzle-receiving opening such that the fuel vapor is prevented from flowing to the atmosphere through said nozzle-receiving opening.

14. A capless refueling assembly according to claim 11, wherein said housing assembly includes an outer housing portion and an inner housing portion coupled together.

15. A capless refueling assembly according to claim 11, wherein said closure comprises a rigid annular structure and a filtering member mounted within said rigid annular structure.

16. A capless refueling assembly according to claim 11, wherein said housing assembly has an aperture which is vented to the atmosphere when the fuel nozzle is inserted into the nozzle-receiving opening thereby creating a fluid seal about the fuel nozzle.

17. A capless refueling assembly according to claim 11, wherein said movable components of said capless refueling assembly are balanced about a pivot axis of said primary seal.

* * * * *

UNITED STATES PATENT AND TRADEMARK OFFICE
CERTIFICATE OF CORRECTION

PATENT NO. : 6,009,920  
DATED : January 4, 2000  
INVENTOR(S) : Sandor Palvoelgyi et al.

Page 1 of 2

It is certified that error appears in the above-identified patent and that said Letters Patent is hereby corrected as shown below:

Title page,
Delete the illustrative figure and replace with the attached title page.

Signed and Sealed this

Fifth Day of March, 2002

Attest:

JAMES E. ROGAN
*Attesting Officer*     *Director of the United States Patent and Trademark Office*

United States Patent [19]
Palvoelgyi et al.

[11] Patent Number: 6,009,920
[45] Date of Patent: Jan. 4, 2000

[54] CAPLESS REFUELING ASSEMBLY

[75] Inventors: Sandor Palvoelgyi, Weiz, Austria; Peter Reinlaender, Tottenham, Canada; Gunther Pozgainer, Weiz, Austria

[73] Assignee: Tesma International Inc., Ontario, Canada

[21] Appl. No.: 09/118,316

[22] Filed: Jul. 17, 1998

Related U.S. Application Data

[60] Provisional application No. 60/052,082, Jul. 17, 1998.

[51] Int. Cl.[7] .................................................. B65B 3/18
[52] U.S. Cl. ........................ 141/348; 141/59; 141/302; 220/86.2; 220/746; 137/588
[58] Field of Search ............................... 141/2, 8, 44–46, 141/59, 290, 302, 304, 305, 312, 348–350; 137/587–589; 220/86.1, 86.2, 746

[56] References Cited

U.S. PATENT DOCUMENTS

| | | |
|---|---|---|
| 2,294,190 | 8/1942 | Lee . |
| 2,574,836 | 11/1951 | Marcell . |
| 3,730,216 | 5/1973 | Arnett et al. . |
| 3,911,977 | 10/1975 | Berger . |
| 4,274,549 | 6/1981 | Germain . |
| 4,498,600 | 2/1985 | Blion . |
| 4,630,749 | 12/1986 | Armstrong et al. ............... 220/86.2 |
| 4,651,889 | 3/1987 | Uranishi et al. . |
| 4,706,708 | 11/1987 | Fornuto et al. .................... 137/588 |
| 4,714,172 | 12/1987 | Mooris . |
| 4,719,949 | 1/1988 | Mears ................................. 141/301 |
| 4,747,508 | 5/1988 | Sherwood ......................... 220/86.2 |
| 4,765,504 | 8/1988 | Sherwood et al. . |
| 4,816,045 | 3/1989 | Szlaga et al. . |
| 4,941,587 | 7/1990 | Terada ............................... 220/86.2 |
| 4,946,060 | 8/1990 | Sherwood et al. ................ 220/86.2 |
| 4,966,299 | 10/1990 | Teets et al. . |
| 5,022,433 | 6/1991 | Jansky et al. ..................... 137/588 |
| 5,042,678 | 8/1991 | Munguia . |
| 5,056,570 | 10/1991 | Harris et al. . |

(List continued on next page.)

FOREIGN PATENT DOCUMENTS

| | | |
|---|---|---|
| 0 223 051 | 6/1989 | European Pat. Off. . |
| 196 38 162 | 3/1997 | Germany . |
| 96/00135 | 1/1996 | WIPO . |
| 96/33095 | 10/1996 | WIPO . |

Primary Examiner—J. Casimer Jacyna
Attorney, Agent, or Firm—Pillsbury Madison & Sutro, LLP

[57] ABSTRACT

The present invention is a capless refueling assembly for a motor vehicle fuel tank. The capless refueling assembly has a housing assembly having a nozzle-receiving opening in fluid communication with the fuel tank such that a fuel nozzle can be inserted in the nozzle-receiving opening and supply liquid fuel to the fuel tank. A primary seal is mounted within the housing assembly for pivotal movement between a sealed position wherein the primary seal sealingly closes the nozzle-receiving opening and an open position. The pivotal movement is responsive to a fuel nozzle being inserted into and removed from the nozzle-receiving opening. A closure is pivotally mounted to the housing assembly for movement between a covering position wherein the closure covers a mouth of the nozzle-receiving opening and an access position wherein a fuel nozzle can be inserted into the nozzle-receiving opening. A vapor venting valve engages the primary seal for cooperative movement therewith. The vapor valve includes a first biasing element for biasing the primary seal to the sealed position. The venting valve is movable between a venting position wherein fuel vapor in the fuel tank is permitted to vent from the fuel tank through a vapor flow path and a valve closed position wherein fuel vapor in the fuel tank is prevented from venting through said vapor flow path. The venting valve includes a second biasing element for biasing the venting valve to the valve closed position. The movement of the venting valve is responsive to a fuel nozzle being inserted into and removed from the fuel nozzle-receiving opening and responsive to a pressure condition in the fuel tank. The primary seal is movable from the sealed position overcoming the first biasing element in response to a vacuum condition in the fuel tank.

17 Claims, 12 Drawing Sheets